No. 791,559. PATENTED JUNE 6, 1905.
L. A. KEENE.
JOURNAL BEARING.
APPLICATION FILED JULY 25, 1904.
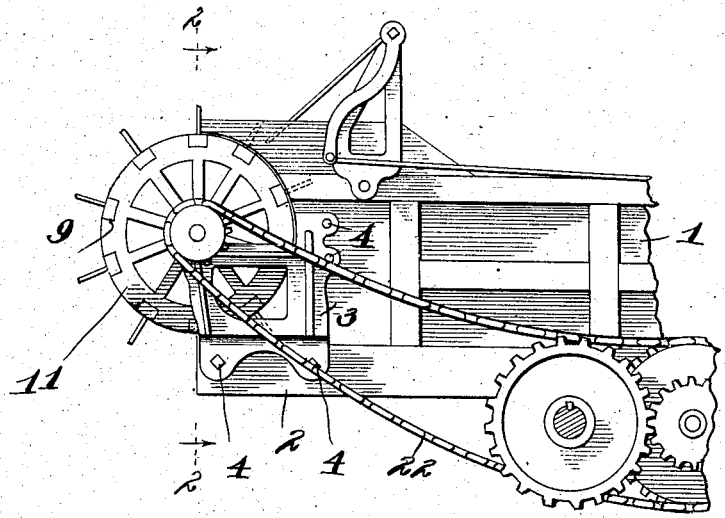
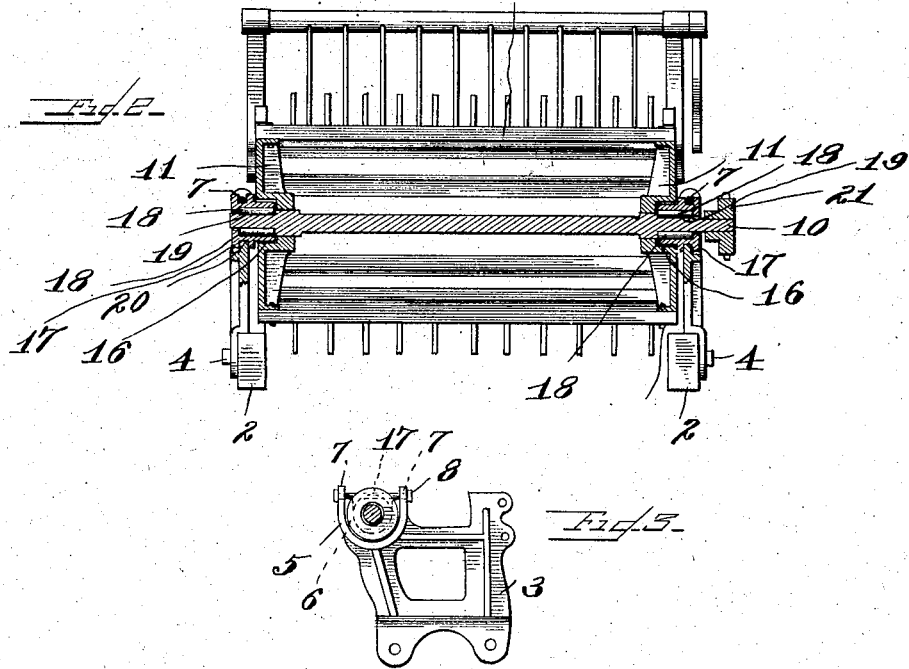
Witnesses
G. A. Paulenschmidt
George L. Chindahl
Inventor
Louis A. Keene
By Luther L. Miller
Atty No. 791,559.

Patented June 6, 1905.

UNITED STATES PATENT OFFICE.

LOUIS A. KEENE, OF WATERMAN, ILLINOIS.

JOURNAL-BEARING.

SPECIFICATION forming part of Letters Patent No. 791,559, dated June 6, 1905.

Application filed July 25, 1904. Serial No. 217,923.

*To all whom it may concern:*

Be it known that I, LOUIS A. KEENE, a citizen of the United States, residing at Waterman, in the county of Dekalb and State of Illinois, have invented certain new and useful Improvements in Journal-Bearings, of which the following is a specification.

One of the objects of this invention is the production of a journal-bearing especially adapted for use upon wheeled structures subjected to twisting strains or distortions, such as manure-spreaders and other agricultural implements.

A further object of the invention is the production of means in a journal-bearing for permitting the ready withdrawal of the journal from the bearing.

The invention further refers to the improvements in detail in journal-bearings, hereinafter more fully shown and described.

In the accompanying drawings, Figure 1 shows in side elevation the rear end of a manure-spreader to which my invention is applied. Fig. 2 is a transverse vertical section through the beater-cylinder on dotted line 2 2 of Fig. 1. Fig. 3 is a view showing one of the supporting-brackets for the beater-cylinder.

In the drawings, 1 refers to a manure-spreader body, having the usual side sills 2. Bearing-brackets 3 are secured, by means of wood-screws 4 or in any other suitable manner, to the spreader-body 1, on the outer sides thereof. These brackets are rectangular in general outline and at their rear upper corners are provided with integral bearing-yokes 5, having the inwardly-extending flanges 6. The upper ends of the yokes are provided with coinciding openings 7, through which a bolt 8 is adapted to extend for a purpose to appear later herein.

The beater 9 is mounted upon a shaft 10, the spiders 11, forming the opposite ends of said beater, being secured to said shaft in any suitable manner, as by keys. (Not shown.) In the outer faces of the spiders 11 are formed annular recesses 16, surrounding said shaft, within which recesses bearing-sleeves 17 are adapted to lie. Rollers 18 are placed within openings 19, formed between the shaft and the sleeves, which rollers may be supported within the usual cages. (Not shown.) In the outer ends of each of the sleeves 17 is an annular groove 20, adapted to receive the flange 6 of the yoke 5 to hold said sleeve from lateral displacement. Upon one side the sleeves 17 are grooved for the passage of the bolt 8, which bolt lies within the openings 7 in the ears of each of the yokes 5 in the bracket 3. Upon one of its ends, outside of the bracket 3, the beater-shaft 10 carries a fixed sprocket-wheel 21, which sprocket-wheel is adapted to receive an endless chain 22, by means of which the beater is rotated.

By the construction herein shown the beater-bearings are made long, and by reason of the support of the sleeves 17 within the brackets 3 said bearings are yielding to provide against a binding of the beater-shaft within its bearings due to a twisting of the spreader-body 1 when it is moved over rough ground. The beater may readily be removed from the spreader-body by withdrawing the bolts 8 from the openings 7 in the yokes 5. When these bolts are removed and the chain 22 disconnected, the beater may be lifted bodily from the yokes 5. The bearing-sleeves 17 are of considerable length and are let into the spiders 11 in order to remove projecting surfaces upon which stalks and straw can lodge to clog the beater, as well as to provide a long bearing, as hereinbefore explained.

It is clear that various changes may be made in the construction herein shown and described without departing from the spirit and scope of my invention, wherefore I desire to have it understood that I do not limit myself to the precise details herein set forth.

I claim as my invention—

1. In a journal-bearing, in combination, a bearing-bracket comprising a yoke having upwardly-extending arms; a bearing to receive a journal and to lie in said yoke; and a removable bolt extending across said yoke above said bearing for retaining said bearing therein.

2. In a journal-bearing, in combination, a bearing-bracket comprising a yoke; an inwardly-extending flange in said yoke; and a bearing adapted to lie in said yoke, said bearing having a groove adapted to receive said flange.

3. In a journal-bearing, in combination, a bearing-bracket comprising a yoke; an inwardly-extending flange in said yoke; a bearing adapted to lie in said yoke, said bearing having a groove adapted to receive said flange; and a bolt extending across said yoke for retaining said bearing therein, said bearing being grooved to receive said bolt in order to prevent said bearing from turning in said yoke.

4. In a journal-bearing, in combination a bearing-bracket comprising a yoke the inner sides of which are substantially semicylindrical; a substantially cylindrical bearing-sleeve adapted to lie in said yoke; removable means for retaining said sleeve therein; and means for preventing rotation of said bearing-sleeve in said yoke.

5. In a journal-bearing, in combination, a bearing-bracket comprising a yoke the inner sides of which are substantially semicylindrical; a substantially cylindrical bearing-sleeve adapted to lie in said yoke; removable means for retaining said sleeve therein; means for preventing rotation of said bearing-sleeve in said yoke; and means for preventing end movement of said bearing-sleeve in said yoke.

6. The combination, with a rotatable machine element having a recess in one of its ends, of a journal for said element, means for rotatably supporting said journal comprising a bearing-sleeve adapted to extend into said recess, and a supporting-bracket for said bearing-sleeve.

7. The combination, with a rotatable machine element having a recess in one of its ends, of a journal for said element, a bearing-sleeve on said journal adapted to extend into said recess, a bearing-bracket comprising a yoke, an inwardly-extending flange in said yoke, said bearing-sleeve having a groove therein adapted to receive said flange, and a bolt extending across said yoke for retaining said bearing-sleeve therein, said sleeve being grooved to receive said bolt in order to prevent said sleeve from turning in said yoke.

8. The combination, with a rotatable machine element having a recess in one of its ends, of a journal for said element, a bearing-sleeve on said journal adapted to extend into said recess, there being an annular flange on said sleeve adapted to lie adjacent to the end of said machine element, and means for removably supporting said bearing-sleeve.

9. The combination, with a rotatable machine element having a recess in one of its ends, of a journal for said element, a bearing-sleeve on said journal adapted to extend into said recess, there being an annular flange on said sleeve adapted to lie adjacent to the end of said machine element, a bearing-bracket for supporting said sleeve, means for retaining said sleeve in said bracket, and means for preventing end movement of said sleeve in said bracket.

LOUIS A. KEENE.

Witnesses:
M. R. PHARIS,
CHAS. G. ARNOLD.